United States Patent [19]

Maron

[11] Patent Number: 5,052,796
[45] Date of Patent: Oct. 1, 1991

[54] FILM REGISTRATION APPARATUS FOR A CAMERA AND METHOD

[76] Inventor: Stanislay Maron, 7801 N. 54th St., Paradise Valley, Ariz. 85253

[21] Appl. No.: 542,259

[22] Filed: Jun. 21, 1990

[51] Int. Cl.$^5$ .............................................. G03B 1/48
[52] U.S. Cl. .................................. 352/221; 352/225; 352/208
[58] Field of Search ..................... 352/221, 225, 208; 226/55, 56, 57, 58

[56] References Cited

U.S. PATENT DOCUMENTS

| | | | |
|---|---|---|---|
| 1,944,031 | 1/1934 | Laug . | |
| 2,506,649 | 5/1950 | Reeves . | |
| 2,733,633 | 2/1956 | Wottring . | |
| 3,428,395 | 2/1966 | Mitchell | 352/194 |
| 3,625,406 | 12/1971 | Campbell | 226/52 |
| 3,776,626 | 12/1973 | Lewis | 352/194 |
| 3,914,035 | 10/1975 | Satterfield | 352/225 |
| 3,997,251 | 12/1976 | Mitchell | 352/72 |
| 4,331,396 | 5/1982 | Nyman et al. | 352/85 |
| 4,360,254 | 11/1982 | Nyman et al. | 352/166 |
| 4,410,254 | 10/1983 | Niemuth et al. | 354/203 |
| 4,534,630 | 8/1985 | Williamson | 352/194 |
| 4,726,674 | 2/1988 | Smith et al. | 354/203 |
| 4,835,555 | 5/1989 | Maxwell | 352/194 |

OTHER PUBLICATIONS

Article entitled "Current Information Summary in Product Applications (CIS-80)", May 25, 1985, Kodak.

Primary Examiner—Monroe H. Hayes
Attorney, Agent, or Firm—Cahill, Sutton & Thomas

[57] ABSTRACT

A pressure plate assembly is pivotally mounted about a pivot axis horizontally displaced from the assembly and vertically responsive to movement of a cam. A pair of rods, nested within an underlying aperture plate assembly during imaging, lifts the film during transport and permit horizontal sliding of a film strip into the film transport compartment from without.

30 Claims, No Drawings

FILM REGISTRATION APPARATUS FOR A CAMERA AND METHOD

CROSS REFERENCE TO RELATED APPLICATIONS

This application describes subject matter related to the invention disclosed in pending application entitled "FILM REGISTRATION APPARATUS AND SHUTTER FOR A CAMERA AND METHOD", Ser. No. 260,450, filed Oct. 20, 1988, now U.S. Pat. No. 4,950,071 issued Aug. 21 1990, and "RETICLE MASKING APPARATUS FOR A CAMERA AND METHOD", Ser. No. 542,260, filed concurrently herewith on June 21, 1990.

BACKGROUND OF THE INVENTION

1. Field of the Invention

The present invention relates to film transport mechanisms and, more particularly, to film registration devices.

2. Description of the Prior Art

Registration of a film strip for obtaining a multi exposure image generally includes a pair of non precisely dimensioned registration pins cooperating with the sprocket holes in the film strip. Such pair of pins do not accommodate for various common problems, such as film elongation. Moreover, the registration pins are associated with the structure for holding the film in place and impede or otherwise render difficult insertion and/or removal of a film strip, advancement of a film strip and other film strip transport requirements. In some prior art configurations, difficulties exist with regard to accurate and precise mounting and demounting masks and other elements to be superimposed with an image on a film strip.

SUMMARY OF THE INVENTION

A pressure plate and mounting plate unit is secured to a lever pivotally mounted at a distance therefrom. Support arms extending from the pressure plate raise a length of film upon upward pivotal movement of the unit to disengage the film from registration pins. The support arms permit film insertion and removal horizontally from the front. A pin accurately dimensioned in both the lateral and the longitudinal axis and a pin accurately dimensional in the lateral axis only cooperate with the film strip and any masks or images to be superimposed upon the film strip to obtain accurate repeatable positioning in both the longitudinal and lateral axes.

A primary object of the present invention is to provide a camera having a highly accurate film registration device.

Another object of the present invention is to provide apparatus which automatically disengages a film strip from registration pins upon release of a film pressure plate.

Still another object of the present invention is to provide a vertically raised mounting plate and a depending pressure plate for a film strip of a camera.

Yet another object of the present invention is to provide film lifting elements depending from a pressure plate for lifting the film upon upward movement of the pressure plate.

A further object of the present invention is to provide a pivot point for a film mounting and pressure plate unit displaced from the unit.

A still further object of the present invention is to provide support arms depending from a pressure plate which permits horizontal loading and unloading of a strip of film adjacent the pressure plate.

A yet further object of the present invention is to provide a method for loading and unloading a strip of film.

A yet further object of the present invention is to provide a vertically raised pressure plate for accommodating film transport.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 is a front elevational view of the film transport mechanism of a camera;

FIG. 2 is a partial cross sectional view taken along lines 2—2, as shown in FIG. 1;

FIG. 3 is an isometric view of the mounting plate, pressure plate and pivot arm;

FIG. 4a and 4b illustrate the relationship of the film support arms to the pressure plate and to the aperture plate;

FIG. 5 illustrates film supported on the support arms; and

FIG. 6 is an elevational view of the pressure plate, aperture plate and the support arms.

DESCRIPTION OF THE PREFERRED EMBODIMENT

Cameras of the prior art type are capable of functioning adequately from a photographic standpoint but certain deficiencies or manipulative difficulties exist. These include the requirement for manually lifting the film strip off the registration pins to advance the film strip. In one type of prior art camera, a gate is employed to assist in lifting the film off the registration pins but the film must be initially threaded through such gate; sometimes, operators forget to so thread the film strip. Shrinkage of the film strip is an industry wide problem and for precise alignment of superimposed images, such shrinkage may be of significant importance; the conventional registration pins (separately maintaining only either longitudinal or lateral alignment) do not accommodate for such shrinkage while maintaining multiple exposures aligned with one another. Further, loop film transport may be compromised as a result of film shrinkage.

Referring to FIG. 1, there is shown a compartment 10 for housing the film transport mechanism of the present invention. The compartment includes a latchable door (not shown) for providing access to the film transport mechanism as well as access to the film being transported and to any masks which are to be added or removed. The door is made light tight upon closure by conventional well known means. A feed reel of unexposed film is contained within a film box 12. Similarly, film box 14 includes a film reel for taking up the exposed film. Each of the film boxes is removably positioned with respect to compartment 10 by means of interconnecting and position locating pins. Film box 12 includes a door 16 secured thereto via a hinge. A threaded knob 18 is engaged with a stud 20 to retain the door in place. Film box 14 includes a similar door, hinge and knob. Film box 14 includes a shaft for receiving and retaining a film reel. A roller 22 serves as a guide for the film between a mounted film reel and a light tight slot 24 in the bottom of the film box. This slot cooperates with an aligned slot 26 in the top of compartment 10 to provide passage for the respective lengths of the compartment to the film box; film box 12, in combination with compartment 10, includes similar light tight slots.

Film from a film feed reel within film box 12 is threaded through a slot in the film box and a corresponding slot in wall 30 of compartment 10. These slots are made light tight by conventional well known means. The film engages a drive sprocket 32 (mounted on a gear driven shaft) and then passes partially about a roller 38 to a pivotally mounted roller 36 to provide tension to the film strip. Roller 36 is mounted on arm 34 extending from boss 40 and positionally sensed by a miniature switch. A film cutting device 42 may be disposed to act upon the strip of film 44 intermediate rollers 34 and 36. From roller 36, the strip of film passes to sprocket 46. Roller 48 guides the film onto sprocket 32. From the sprocket, the film passes through slot 26 in top wall 50 and corresponding slot 24 in film box 14 to the take up reel within the film box.

To preclude light exposure of a film strip upon withdrawal from the camera (60) and insertion into film box 14, a length of material 56, such as felt, is adhered to the interior surface of wall 50 adjacent slot 26 and extends via a loop 58 into the slot for adhering contact with slot wall 60. A support 62 depends from wall 50 adjacent slot 26. A length of material 64, such as felt, is adhered to a vertical wall of support 62 and extends into slot 26 in adhering relationship to slot wall 66. Support 62, in combination with wall 50, will serve in the manner of a guide to direct the end of a film strip into slot 26 intermediate the opposing materials. A length of material 70, such as felt, is adhered to surface 72 of film box 14. The material is looped upwardly therefrom and downwardly into slot 24. The penetrating portion of material 70 is adhered to slot wall 74. A further length of material 76, such as felt, is adhered to slot wall 78 and extends upwardly therefrom into adhering contact with surface 80 of upright wall 82 of film box 12. The film box may include a roller 84 to guide the film strip from slot 24 onto the take up reel. The opposed lengths of material within slot 26 and within slot 24 preclude transmission of light therethrough and maintain the interior of the camera and the interior of the film box light tight. The slot in film box 12 and the corresponding slot in wall 30 include similar lengths of material to ensure that the slots are light tight.

Referring jointly to FIGS. 1, 2, and 3, pressure plate assembly 90 will be described in further detail. A cam 92 extends from back wall 94 of compartment 10 and is mounted to permit rotation in response to drive means; note shaft 96 journaled in back wall 94 and rotatable through a gear 98. A Geneva mechanism (not shown) may be used to rotate shaft 96 and cam 92. A plurality of miniature switches (not shown) may be used to generate timing signals and position indicators. Cam 92 cooperates with an anvil 100 to bring about vertical displacement of the anvil in correspondence with rotation of the cam. The anvil is secured to a mounting plate 102, which mounting plate is rigidly secured to pivot arm 104 by one or more bolts 106. A pressure plate 108 depends from mounting plate 102 via studs 110, which studs threadedly engage one of apertures 112. A coil spring 114 is disposed about each stud and intermediate the pressure plate and the mounting plate to bias the pressure plate downwardly from the mounting plate and yet accommodate upward movement of the pressure plate by sliding movement of the shafts through the mounting plate. A collar 116 associated with each stud limits downward displacement of the stud in response to urging of coil springs 114.

Pivot arm 104 extends upwardly from mounting plate 102 and includes a cutaway position 116 to clear sprocket 46; additionally the pivot arm includes an indentation 118 to clear film strip 44 transversing from sprocket 46 to roller 48. A sleeve 120 extends from the end of the pivot arm for pivotal engagement with a shaft 122 extending from rear wall 94. Means are employed to retain the sleeve on the shaft. A coil spring 124 is secured to mounting plate 102 by a stud 126 or the like and to rear wall 94 by a further stud 128 or the like. The coil spring biases mounting assembly 90 upwardly and urges ongoing contact between cam 92 and anvil 100.

A plurality of channels 130 extend transversely across the pressure plate in alignment with the direction of travel of a strip of film disposed thereheneath. These channels permit disbursal of air intermediate the strip of film and the pressure plate, which air might otherwise serve in the manner of a cushion and preclude full downward travel of the pressure plate. It has been learned that the use of channels provides substantially better results in dissipating air than the use of holes in the pressure plate for this purpose.

Registration of the film strip with aperture plate assembly 140 is assured through the use of two registration pins 136,138. Apertures 140,142 within pressure plate 108 positionally correspond with the registration pins to permit penetration thereinto of the registration pins. Aperture 144 within aperture plate assembly 134 defines the size of the picture frame and corresponding segment of film to be exposed, assuming that a mask or the like is not employed. Since registration of the film is of critical importance only with respect to the area defined by aperture 144, pins 136,138 are located laterally adjacent the aperture and in alignment with sprocket holes 146 in film strip 44. One standard size of sprocket holes 146 is 0.110 inches in length by 0.078 inches in width. To align the film strip in the direction of travel, it is important to ensure that there is not even slight angular misalignment. Such alignment is achieved by registration pins 136 and 138. Pin 136 is exactly 0.110 inches long and 0.078 inches wide to ensure an exact fit with each penetrated sprocket hole 146 and prevents both lateral and longitudinal movement of the film strip. Pin 138 is exactly 0.078 inches wide to ensure exact fit with the opposed short sides of each sprocket; thus, it prevents lateral movement of the film strip. The above measurements are for Kodak film perforation; for Bell and Howell film perforation, the dimensions would be 0.110 inches and 0.073 inches.

To assist in penetrable engagement of each registration pin with the respective sprocket hole, the registration pins may have their top surface sloped or beveled along an axis transverse to the direction of travel of the film strip to facilitate penetration with a sprocket hole. By use of these two pins wherein one pin positions the film strip in one axis only and the other pin positions the film strip in both axes, very precise positioning of the film strip may be accomplished. Such exactness in positioning is of great importance in order to achieve exact and precise positioning of any masks or overlays used in conjunction with the formation of an image.

To assist in disengaging the film strip from registration pins 136,138 during transport of the film, support arms 150,152 are employed beneath pressure plate 108. A flange 154 depends from the rear edge of pressure plate 108. A pair of arms or rods 156,158 are secured to the flange and extend forwardly therefrom to approximately the front edge of the pressure plate. Each of these rods may have its center section slightly bowed downwardly; alternatively, the thickness of the center section may be reduced along the top surface. With such bowing or reduction in thickness at the center section, contact with a supported film strip will be primarily along the opposed edges of the film strip at or outwardly from the sprocket holes. Thereby, scratches in the image area will be avoided by precluding contact between the image area and the rods. Aperture plate assembly 134 includes an indentation 160 for receiving flange 154. Further, the aperture plate assembly includes a pair of channels 162,164 for receiving rods 156,158, respectively, when the pressure plate is in its downward most position.

As particularly depicted in FIG. 5, mounting of film strip 44 can be readily made from the front of camera 10 by simply sliding horizontally and inwardly the film strip between rods 156,158 and pressure plate 108. Such sliding movement requires a minimum of skill and manual dexterity. During advance of film strip 44, pressure plate assembly 90 is raised in response to the force exerted by spring 124 when cam 92 is in the position depicted in FIG. 1. The commensurate rise of pressure plate 108 will lift film strip 44 upwardly out of registration with pins 136,138 due to the supporting or cradling function performed by rods 156,158. Upon advance of the film, the support for the film received from the rods is provided along the lateral edges of the film and contact between the image area of the film with the center section of the rods is precluded as a result of the bowing or downwardly curved center section of each of the rods.

Pivot arm 144, pivotally supporting pressure plate assembly 90, is pivotally attached to the right of sprocket 46. This will tend to cause the pressure plate assembly to have a slight tilt upon being raised, which tilt is greatest at the location of rods 156,158 to provide maximum space for inserting or removing the film and a minimum tilt adjacent sprocket 46 which will tend to maintain the film strip generally aligned with and generally tangent to the lower part of the sprocket. The location of shaft 122, defining the pivotal axis of the pressure plate assembly, is generally horizontally displaced from the sprocket. Such location of the pivot axis, considering the limited pivot angle, will essentially raise the pressure plate assembly without a resulting lateral displacement toward or away from sprocket 46.

The use of a sleeve 120 having a width approximately commensurate with that of the pressure plate assembly will tend to eliminate any likelihood of binding during pivotal movement since skewing of the pressure plate assembly is unlikely and any tendency for skewing would be immediately resisted by the extended length of sleeve 120. Furthermore, the force exerted by spring 124 is in general planar alignment with pivot arm 104 and the spring will contribute no significant force to urge skewing. By having pivot arm 104 extend about sprocket 46, the required depth of compartment 10 is maintained minimal. Furthermore, indentation 118 accommodates transport of film strip 44 without requiring the film strip and its supporting pulleys and sprockets to be located further from rear wall 94; accordingly, the depth of compartment 10 is again minimal.

As particularly illustrated in FIGS. 1 and 2, a sliding mirror mechanism 170 is employed. Transport of the mirror mechanism is provided through cable 172 supported by canted pulley 174 and cable 176 supported by canted pulley 178. A point of attachment 180 on side 182 of mirror mechanism 170 is located above the bottom of the mirror mechanism and forwardly of the rear edge. Pulley 174 is located in general vertical alignment with rear surface 184. Accordingly, cable 172 will exert a bias upon mirror mechanism 170 to maintain the mirror mechanism against rear wall 184 and against bottom surface 186. Cable 176 is similarly attached to mirror mechanism 170; it also tends to bias the mirror mechanism toward the rear wall and the bottom. To minimize drag and promote smooth movement of the mirror mechanism, a low friction material may be disposed between the mirror mechanism and the rear wall and between the mirror mechanism and the bottom. For example, bottom 186 may be covered with a sheet of low friction material 188 sold under the trademark Teflon. Strips 190,192 of this material may be attached to opposed ends of bottom 194 of mirror mechanism 170. A similar sheet of material may be attached to rear wall 184 with strips of such material attached to the rear side of the mirror mechanism. Necessarily, motive means are provided to draw and release each of cables 172,176 to effect reciprocating movement of the mirror mechanism. Limit switches, such as miniature switches 196 and 198 responsive to repositioning of the mirror mechanism may be employed.

Bottom plate 200 of compartment 10 includes a aperture 202 cooperating with a bellows and lens apparatus (not shown). Mirror mechanism 170 includes a mirror 204 to permit viewing a superimposed image. A film strip containing the image to be superimposed may be placed adjacent window 206 and retained in place by door 208, which door includes a transparent element 210. Such superimposition of an image can be viewed when the mirror mechanism is in the position depicted in FIG. 1. To project an image upon film strip 44, mirror mechanism 170 is transported to the right (as shown in FIG. 1) to draw mirror 204 out of the way and permit the left half 212 of the mirror mechanism to come into alignment with aperture 202 in bottom plate 200 and a segment of the film strip retained in place by pressure plate 108. Left half 212 of the mirror mechanism includes a passageway extending therethrough commensurate in size with aperture 202 and the size of the image to be formed in the film strip.

It is to be appreciated that a shutter mechanism, such as a mirror reflex shutter, can also be used in combination with pressure plate assembly 90 when a rotary shutter, such as that described in patent application Ser. No. 260,450, now U.S. Pat. No. 4,950,071, is not used. Yet further shutter mechanisms are also contemplated.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirement without departing from those principles.

I claim:

1. Film registration apparatus for repetitively registering a frame of a film strip with respect to an aperture in an aperture plate for a camera, said apparatus comprising in combination:
   a) a pressure plate for urging the film strip adjacent the aperture plate;
   b) a mounting plate for supporting said pressure plate, including spring means disposed between said pressure plate and said mounting plate for urging said pressure plate away from said mounting plate and toward the aperture plate;
   c) a pivot arm secured to said mounting plate for defining pivotal movement of said mounting plate;
   d) pivot means for pivotally securing said pivot arm, said pivot means being disposed on a side of a drive sprocket of the camera downstream of the aperture in the aperture plate for urging the edge of said mounting plate upstream of the aperture of the apertured plate to a higher elevation than the edge of said mounting plate downstream of the aperture of the apertured plate;
   e) means for urging upward pivotal movement of said mounting plate;
   f) said pressure plate including support means for lifting the film strip upon upward movement of said mounting plate; and
   g) means responsive to a cam of the camera for urging downward movement of said mounting plate about said pivot means to urge said pressure plate against the film strip and to maintain the film strip in registration.

2. The apparatus as set forth in claim 1 wherein said support means is configured to contact the film strip only on opposed sides of the film strip.

3. The apparatus as set forth in claim 2 wherein said support means is centrally downwardly bowed.

4. The apparatus as set forth in claim 2 wherein the upper surfaces central of said support means are at a lower height than the respective opposed ends of said support means.

5. The apparatus as set forth in claim 1 including recess means disposed in the aperture plate for receiving said support means upon downward displacement of said pressure plate.

6. The apparatus as set forth in claim 5 wherein said recess means accommodates downward displacement of said support means sufficient to prevent contact between the film strip and said support means upon downward displacement of said pressure plate.

7. The apparatus as set forth in claim 1 wherein said support means includes a pair of rods extending transversely across the film strip from one edge of said pressure plate.

8. The apparatus as set forth in claim 7 wherein one pair of ends of said pair of rods are free to accommodate placement of the film strip between said pressure plate and said pair of rods through sliding movement of the film strip in alignment with the longitudinal axis of said pair of rods.

9. The apparatus as set forth in claim 8 including means for securing the other pair of ends of said pair of rods to said pressure plate.

10. Film registration apparatus for repetitively registering a frame of a film strip with respect to an aperture in an aperture plate for a camera, said apparatus comprising in combination:
    a) a pressure plate for urging the film strip adjacent the aperture plate;
    b) a mounting plate for supporting said pressure plate, including spring means disposed between said pressure plate and said mounting plate for urging said pressure plate away from said mounting plate and toward the aperture plate;
    c) a pivot arm secured to said mounting plate for defining pivotal movement of said mounting plate;
    d) pivot means for pivotally securing said pivot arm, said pivot means being disposed in general alignment with the plane defined by the aperture plate to minimize horizontal movement of said pressure plate relative to the aperture plate during pivotal movement of said mounting plate;
    e) means for urging upward pivotal movement of said mounting plate;
    f) said pressure plate including support means for lifting the film strip upon upward movement of said pressure plate;
    g) means responsive to a cam of the camera for urging downward movement of said mounting plate about said pivot means to urge said pressure plate to maintain the film strip in registration.

11. The apparatus as set forth in claim 10 wherein said support means includes a pair of rods extending transversely across the film strip from one edge of said pressure plate.

12. A method for repetitively registering a frame of a film strip with respect to an aperture in an aperture plate of a camera, said method comprising the steps of:
    a) urging the film strip adjacent the aperture plate with a pressure plate;
    b) supporting the pressure plate from a mounting plate, including the step of urging the pressure plate away from the mounting plate and toward the aperture plate with spring means disposed between the mounting plate and the pressure plate;
    c) defining pivotal movement of the mounting plate with a pivot arm secured to the mounting plate;
    d) securing the pivot arm with pivot means disposed on a side of a drive sprocket of the camera downstream of the aperture in the aperture plate;
    e) urging upward pivotal movement of the mounting plate;
    f) supporting the film strip from the pressure plate to raise the film strip from the aperture plate upon upward pivotal movement of the mounting plate;
    g) in response to a cam of the camera, urging downward movement of the mounting plate about the pivot means to urge the pressure plate to maintain the film strip in registration.

13. The method as set forth in claim 12 wherein said step of supporting comprises the step of supporting only the opposed edge sections of the film strip.

14. The method as set forth in claim 12 wherein the step of supporting is carried out by support arms extending from the pressure plate and including the step of recessing the support arms within a recess formed in the aperture plate upon downward movement of the pressure plate.

15. The method as set forth in claim 14 wherein said step of supporting comprises the step of supporting only the opposed edge sections of the film strip.

16. The method as set forth in claim 14 including the step of sliding the film strip intermediate the pressure plate and the support arms along a path parallel with the longitudinal axis of the support arms to load and to unload the film strip.

17. Film registration apparatus for repetitively registering a frame of a film strip with respect to an aperture in an aperture plate for a camera, said apparatus comprising in combination:
   a) a pressure plate for urging the film strip adjacent the aperture plate;
   b) a mounting plate for supporting said pressure plate, including spring means disposed between said pressure plate and said mounting plate for urging said pressure plate away from said mounting plate and toward the aperture plate;
   c) means secured to said mounting plate for defining the movement of said mounting plate;
   d) means for urging upward pivotal movement of said mounting plate;
   e) support means for lifting the film strip upon upward movement of said mounting plate; and
   f) means responsive to a cam of the camera for urging downward movement of said mounting plate to urge said pressure plate against the film strip and to maintain the film strip in registration.

18. The apparatus as set forth in claim 17 wherein said support means is configured to contact the film strip only on opposed sides of the film strip.

19. The apparatus as set forth in claim 18 wherein said support means is centrally downwardly bowed.

20. The apparatus as set forth in claim 18 wherein the upper surfaces central of said support means are at a lower height than the respective opposed ends of said support means.

21. The apparatus as set forth in claim 17 including recess means disposed in the aperture plate for receiving said support means upon downward displacement of said pressure plate.

22. The apparatus as set forth in claim 21 wherein said recess means accommodates downward displacement of said support means sufficient to prevent contact between the film strip and said support means upon downward displacement of said pressure plate.

23. The apparatus as set forth in claim 17 wherein said support means includes a pair of rods extending transversely across the film strip from one edge of said pressure plate.

24. The apparatus as set forth in claim 23 wherein one pair of ends of said pair of rods are free to accommodate placement of the film strip between said pressure plate and said pair of rods through sliding movement of the film strip in alignment with the longitudinal axis of said pair of rods.

25. The apparatus as set forth in claim 24 including means for securing the other pair of ends of said pair of rods to said pressure plate.

26. A method for repetitively registering a frame of a film strip with respect to an aperture in an aperture plate of a camera, said method comprising the steps of:
   a) urging the film strip adjacent the aperture plate with a pressure plate;
   b) supporting the pressure plate from a mounting plate movable upwardly and downwardly, including the step of urging the pressure plate away from the mounting plate and toward the aperture plate with spring means disposed between the mounting plate and the pressure plate;
   c) defining the upward and downward movement of the mounting plate;
   d) urging upward pivotal movement of the mounting plate;
   e) supporting the film strip from the pressure plate to raise the film strip from the aperture plate upon upward movement of the mounting plate; and
   f) in response to a cam of the camera, urging downward movement of the mounting plate to urge the pressure plate to maintain the film strip in registration.

27. The method as set forth in claim 26 wherein said step of supporting comprises the step of supporting only the opposed edge sections of the film strip.

28. The method as set forth in claim 26 wherein the step of supporting is carried out by support arms extending from the pressure plate and including the step of recessing the support arms within a recess formed in the aperture plate upon downward movement of the pressure plate.

29. The method as set forth in claim 28 wherein said step of supporting comprises the step of supporting only the opposed edge sections of the film strip.

30. The method as set forth in claim 28 including the step of sliding the film strip intermediate the pressure plate and the support arms along a path parallel with the longitudinal axis of the support arms to load and to unload the film strip.

* * * * *